March 16, 1971 E. M. MIHALYAK ETAL 3,570,304
PROBE HOLDER ASSEMBLY FOR ULTRASONIC TESTING
OF TURBOMACHINE BLADES
Filed July 28, 1969 — 2 Sheets-Sheet 1
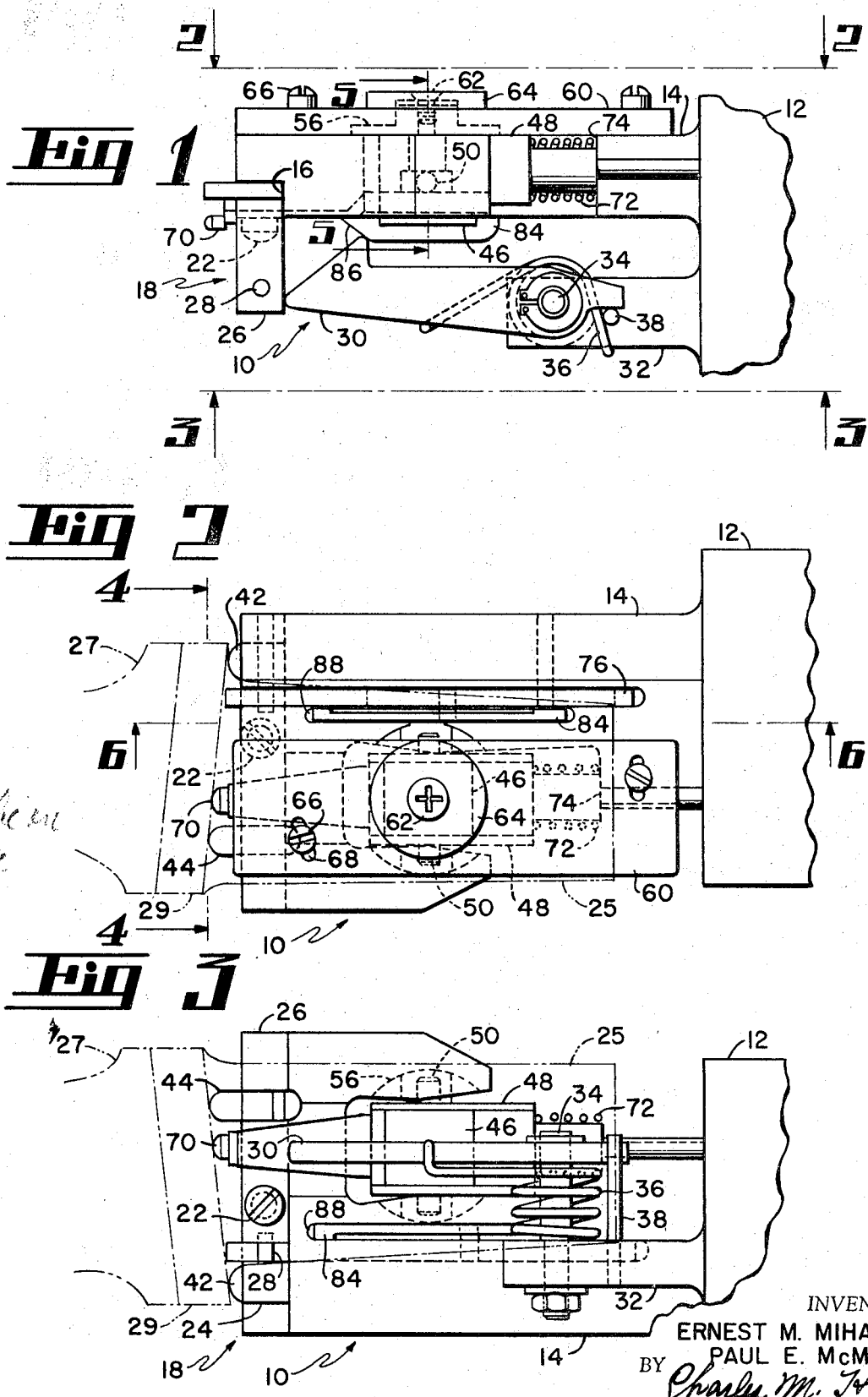
INVENTORS.
ERNEST M. MIHALYAK
PAUL E. McMAHON
BY Charles M. Hogan
Gary M. Gron
ATTORNEYS.

March 16, 1971 E. M. MIHALYAK ET AL 3,570,304
PROBE HOLDER ASSEMBLY FOR ULTRASONIC TESTING
OF TURBOMACHINE BLADES
Filed July 28, 1969 2 Sheets-Sheet 2
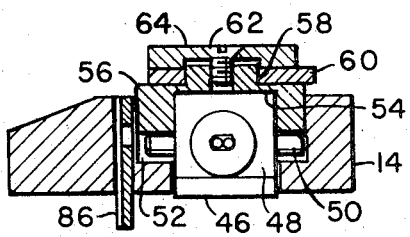
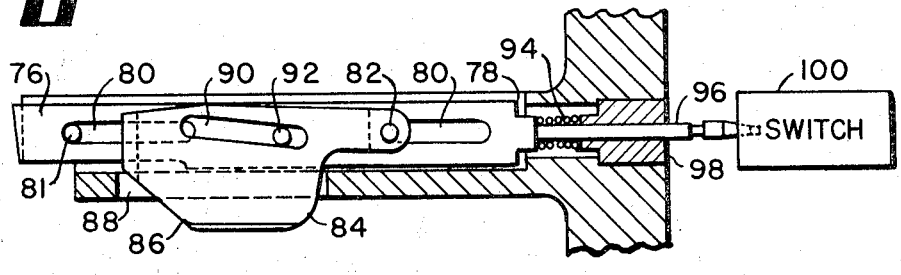
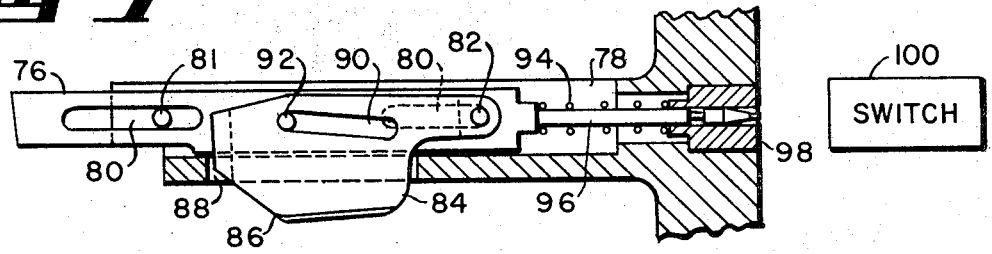
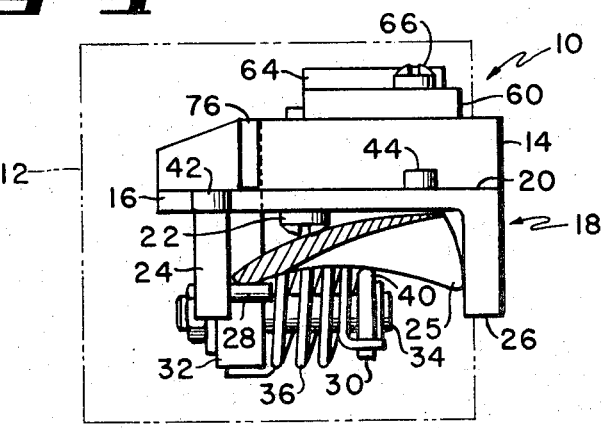
INVENTORS.
ERNEST M. MIHALYAK
PAUL E. McMAHON
BY
Charles M. Hogan
Gary M. Brown
ATTORNEYS.

United States Patent Office 3,570,304
Patented Mar. 16, 1971

3,570,304
PROBE HOLDER ASSEMBLY FOR ULTRASONIC TESTING OF TURBOMACHINE BLADES
Ernest M. Mihalyak, West Haven, and Paul E. McMahon, Milford, Conn., assignors to Avco Corporation, Stratford, Conn.
Filed July 28, 1969, Ser. No. 845,228
Int. Cl. G01n 24/04
U.S. Cl. 73—67.5                              11 Claims

ABSTRACT OF THE DISCLOSURE

The disclosure illustrates a probe for use in ultrasonic testing of a turbomachine blade secured at its root to a rotor. The probe comprises an elongated base and a guide at one end for accurately positioning one side of the base relative to a blade to be tested. An ultrasonic probe is mounted on fulcrums in the base and is adapted to surface contact the blade at a given distance from its root. A cam mechanism supported by the base positively maintains the blade out of contact with the probe until the first end of the base is accurately positioned at the root of the blade. Additionally, a switch is actuated by the cam means to enable energization of the probe only when the first end of the base is positioned at the root of the blade.

---

In recent years ultrasonic nondestructive test methods have been applied in the inspection for defects in turbomachine blades. To use this technique a probe unit is placed in contact with the blade to be tested near one end and is electrically excited to produce high frequency mechanical vibrations. These vibrations travel through the blade and are reflected from its opposite end back to the probe unit. A comparison of the signal transmitted and the signal received gives an indication of the presence or absence of defects or flaws in the blade.

It is necessary in ultrasonic inspection of turbomachine blades to assure coupling and the accurate positioning of the probe unit on the blade of test. The requirement for coupling and accurate positioning is critical because maximum reflections of ultrasonic energy, from especially very small discontinuities, are obtained only when the probe is coupled with the blade and the probe is located perpendicular to a discontinuity or flaw.

Satisfactory performance with the above techniques may be presently obtained only in the laboratory by skilled personnel using hand-held probe units which are manually positioned to obtain a maximum reflected signal. However, laboratory techniques are not applicable to production lot testing by unskilled personnel.

Therefore, it is an object of the present invention to provide an ultrasonic test probe for use in testing of turbomachine blades that enables unskilled personnel to generate accurate results when used for production lot quantities.

The above ends are achieved by using the operator-manipulated probe for ultrasonically testing a turbomachine blade secured at its root to a compressor rotor. The probe includes an operator-manipulated, generally elongated base. A means carried by the base yieldably maintains a blade in a given position relative to the base when a first end of the base is displaced alongside the blade into abutment with the root of the blade. An ultrasonic probe is adapted to surface contact the blade for ultrasonic testing thereof. A means is provided for pivotally mounting the probe on said base and in contact with the blade at a given distance from the blade root when the first end of the base is in abutment with the blade root. A cam means carried by the base positively maintains the blade out of contact with the probe until the first end of said base is in abutment with the blade root.

The above and other related objects and features of the present invention will be apparent from a reading of the description of the disclosure found in the accompanying drawings and the novelty thereof pointed out in the appended claims.

In the drawings:
FIG. 1 is a side elevation view of an ultrasonic probe embodying the present invention;
FIG. 2 is a top view of the probe of FIG. 1 taken on lines 2—2 and showing the probe in position for testing a turbomachine blade secured to a rotor;
FIG. 3 is a bottom view of the probe shown in FIG. 1 taken on lines 3—3, also showing the probe in position to test a turbomachine blade;
FIG. 4 is an end view of the probe of FIG. 1 taken on lines 4—4 of FIG. 2;
FIG. 5 is a view taken on lines 5—5 of FIG. 1;
FIG. 6 is a view taken on lines 6—6 of FIG. 2;
FIG. 7 is a view taken in the same plane as FIG. 6 showing the elements therein in a different position.

Referring now to FIGS. 1, 2 and 3, there is shown an ultrasonic probe holder assembly 10 embodying the present invention. The holder 10 comprises a block 12 from which extends an elongated base 14. The block 12 is suitably fashioned to be manipulated by an operator and also contains electrical connections for the probe unit of the probe holder assembly 10.

The free end of base 14 has a shoulder 16 adapted to receive a U-shaped bracket 18 (see particularly FIG. 4). The U-shaped bracket 18 has a base 20 secured against the shoulder 16 by a screw 22. The bracket 18 has side legs 24 and 26 which are adapted to guide the edges of a blade 25 which is to be tested by the probe. Because turbomachine blades generally have a high degree of camber, a locating pin 28 extends laterally from leg 24 so that it acts as a pivot for one edge of the blade 25. Turbomachine blades frequently are secured to tapered rotors similar to the rotor 27 shown in FIGS. 2 and 3. A pair of tabs 42 and 44 are formed integral with the U-shaped bracket 18. These tabs have given lengths relative to one another so that when the tabs 42 and 44 abut the rotor 27 at the root 29 of blade 25 the elongated base 14 is positively positioned generally normal to the axis of the rotor 27. It is apparent that different U-shaped brackets 18 may be provided for the probe holder assembly 10 to accurately position the probe for blades having configurations other than the configuration shown in FIGS. 2 and 3.

The midsection of the blade 25 is urged towards the base 14 by an arm 30 pivotally mounted on a shaft 34 extending to a bracket 32 integral with block 12. A torsion spring 36 acts on the bracket 32 and the arm 30 to urge the blade 25 towards the base 14. A rod 38 extends laterally from bracket 32 to act as a stop to limit the movement of arm 30 towards the base 14. As is evident in FIG. 1, the arm 30 has a tapered free end 40 so that insertion of the blade 25 through the U-shaped bracket 18 cams the arm 30 away from base 14.

The probe holder assembly 10 has a probe unit comprising a probe 46 adapted to surface contact the blade 25. The probe 46 is mounted in a generally rectangular probe support frame 48. As shown particularly in FIG. 5, the probe support frame 48 has oppositely positioned lugs 50 which are received in slots 52 (see FIG. 1) formed in base 14 to provide a fulcrum mounting for the probe support frame 48. The sides of the probe support frame 48 are received in a central slot 54 formed in the bottom side of a cylindrical support member 56 so that the probe support frame is displaceable in a plane set by the annular position of the cylindrical support 56 relative to the base 14.

The cylindrical support 56 has a boss 58 extending through a support plate 60. A screw 62 holds a cover plate 64 against the top side of a mounting plate 60 to secure the cylindrical support 56 thereto. The mounting plate 60 is secured to the frame 14 by screws 66 extending through slots 68 (see FIG. 2). It can be seen that the plate 60 may be adjustably mounted relative to base 14 to vary the direction of slot 54 in cylindrical support 56 and the plane in which the probe support frame 48 is displaced. It is also possible to provide additional variation by pivoting the cylindrical support 56 relative to mounting plate 60.

A locating tab 70 extends from the probe support frame 48 towards the root 29 of blade 25. A spring 72 acts on the opposite end of probe support frame 48 and a shoulder 74 formed on base 14 to yieldably urge the probe support frame 48 towards the root 29 of blade 25.

As shown particularly in FIGS. 6 and 7, an actuating bar 76 is received in a longitudinal slot 78 formed in base 14. The bar 76 has a pair of slots 80 which receive pins 81, 82 secured in base 14 to limit the longitudinal displacement of actuating bar 76. A cam plate 84 is received in a slot 88 adjacent slot 78 and is pivotally mounted at one end to pin 82. The cam plate 84 has a lobe 86 extending through a slot 88 adjacent the probe 46. The cam plate 84 has a slot 90 which receives a pin 92 secured to the actuating bar 76. The slot 90 is positioned relative to the pivotal mounting of the cam plate 84 so that displacement of the actuating rod 76 to a retracted position relative to base 14 causes the cam lobe 86 to be in a retracted position, as shown in FIG. 6. A spring 94 surrounds a bar 96 extending from the inner end of actuating rod 76. The spring 94 acts on a sleeve 98 in housing 14 and the inner end of actuating bar 76 to urge the bar towards the extended position shown in FIG. 7. In this position the displacement of the pin 92 to the left end of slot 90 in cam plate 84 causes the cam lobe 86 to be extended from slot 88.

The lobe 86 and the actuating bar 76 are sized so that when the bar 76 is extended the cam lobe 86 maintains the blade 25 out of contact with the adjacent probe 46. When the bar abuts the root 29 of the blade 25 it is retracted, thereby retracting the cam lobe 86 and enabling surface contact with the probe 46.

A switch 100 is positioned adjacent the inner end of bar 96 so that when the actuating rod 76 is retracted the switch 100 supplies electrical energy to the probe 46 to excite it and perform a test.

The probe holder assembly 10 is prepared to perform an ultrasonic test of a turbomachine blade, as follows. The plate 60, used to support the probe frame support 48, is pivoted to change the plane in which the probe 46 is displaced relative to the blade that would be supported by base 14. This calibrates the individual probe 46 for a particular holder assembly 10. A finer calibration may be also accomplished by loosening of screw 62 and rotating cylindrical support 56. A couplant (usually oil) then is applied to probe 46 to insure maximum transmission of vibrations from the probe 46 into the blade to be tested.

The end of the probe containing the U-shaped bracket 18 is inserted over the tip of the blade 25 so that the leading edge of the blade pivots on the pin 28. The housing 14 is advanced inward towards the root 29 of the blade 25 so that arm 30 is cammed away from probe 46. During this movement the actuating bar 76 is in the position shown in FIG. 7 so that the cam lobe 86 is in an extended position to maintain the surface of the blade 25 out of surface contact with the probe 46.

As the bracket 18 approaches the root 29 of the blade 25 and the surface of the rotor 27, the actuating bar 76 abuts the rotor 27 and is retracted relative to the base 14. When the actuating bar 76 is fully retracted, cam lobe 86 is retracted and the spring-loaded arm 30 urges the blade 25 into contact with the probe 46. When the actuating bar 76 is fully retracted the rod 96 engages switch 100 which in turn electrically energizes the probe 46 to perform an ultrasonic test for defects in blade 25.

The tabs 42 and 44 abut the rotor 27 so that the base 14 is generally normal to the axis of rotor 27. The U-shaped bracket 18, including the pin 28, maintains the root end of the blade in such a position that the probe 46 is parallel to and in surface contact with the outer portion of blade 25. The locating tab 70 and the spring 72 enable the probe 46 to be accurately positioned relative to the length of the blade 25. The fulcrum mounting of the probe support frame 48 enables the probe 46 to conform to slight curvature of the surface of the blade 25 to insure maximum surface contact and maximum signal readings. When the appropriate reading is noted, or recorded, the probe 46 is pulled away from the root of the blade 25 thereby terminating electrical power to the probe 46 and again maintaining the blade 25 out of contact with probe 46.

The above probe enables a highly accurate and rapid ultrasonic testing of turbomachine blades. Since the fixtures automatically maintain the blade in a proper position relative to the ultrasonic probe, unskilled labor may be utilized to perform the test. Furthermore, the camming arrangement insures that the face of the probe will be protected from inadvertent contact during positioning of the probe on the blade.

Having thus described the invention, what is claimed as novel and desired to be secured by Letters Patent of the United States is:

1. A probe holder for use in ultrasonic testing of a turbomachine blade secured at its root to a rotor, said probe holder comprising:

an operator-manipulated, generally elongated base;

means carried by said base for yieldably maintaining a blade in a given position relative to said base when a first end of said base is displaced alongside said blade into abutment with the root of the blade;

an ultrasonic probe adapted to surface contact said blade for ultrasonic testing thereof;

means for pivotally mounting said probe on said base and in contact with said blade at a given distance from the blade root when the first end of said base is in abutment with the blade root;

cam means carried by said base for positively maintaining said blade out of contact with said probe until the first end of said base is in abutment with the blade root.

2. A probe holder as in claim 1 further comprising means mounted on said base and actuated by said cam means for enabling an ultrasonic test to be conducted only when the first end of said base is in abutment with the root of said blade.

3. A probe holder as in claim 2 wherein said ultrasonic probe is adapted to be energized by electrical energy and said enabling means comprises a switch means responsive to said cam means for supplying electrical energy to said probe only when the first end of said base is in abutment with the root of said blade.

4. A probe holder as in claim 1 wherein said position maintaining means comprises:

a U-shaped bracket secured to the first end of said base and having the sides thereof extending normal to the longitudinal axis of said base and positioned to guide the edges of said blade;

an arm pivotally connected to said base and displaceable to urge said blade against said base; and means for yieldably urging said arm against said base.

5. A probe holder as in claim 4 for testing of a turbomachine blade having a significant amount of camber and secured to a conically extending rotor and wherein said probe further comprises:

a pin extending laterally and inwardly from one of the sides of said U-shaped bracket, said pin being positioned so that it acts as a pivot point for one of the edges of said blade whereby said arm yieldably urges the central portion of said blade towards surface contact with said probe;

stop means extending from the first end of said base and having a length sufficient to maintain the longitudinal axis of the probe base generally normal to the axis of rotation of said rotor.

6. A probe holder as in claim 2 wherein said cam means comprises:

an elongated actuating element extending from the first end of said base and being displaceable normal to the longitudinal axis of said base between an extended and retracted position;

a cam positioned adjacent said probe on said base and displaceable between a retracted position and an extended position wherein it urges said blade away from the probe, said cam being connected to said elongated actuating element so that said cam is extended and is retracted when said actuating element is retracted in response to abutment of the first end of said probe with the root of said blade;

means for yieldably urging said actuating element into said extended position.

7. A probe holder as in claim 6 wherein:

said actuating element comprises a bar displaceable in an elongated slot in said base and having a pin extending laterally therefrom;

said cam comprises a cam element pivotally mounted on said base and having a slot therein for receiving said pin, said slot being displaced from the pivot point of said cam element and being positioned with respect to the pivot point of said cam whereby the cam is pivoted to an extended position in response to displacement of the bar to said retracted position.

8. A probe holder as in claim 7 wherein said means for pivotally mounting said probe on said base comprises:

a probe support frame;

a tab extending from one end of said probe support frame towards the first end of said base and having a predetermined length so that the probe is positioned at a predetermined distance from the root of said blade;

means for forming a pair of oppositely positioned elongated slots in said base adjacent opposite sides of said probe support frame;

pins extending from opposite faces of said probe support frame into said slots;

means for yieldably urging said probe support frame towards the first end of said probe base so that the probe is accurately positioned relative to the root of said blade and is able to conform to the surface contours of said blade.

9. A probe holder as in claim 8 wherein said position maintaining means comprises:

a U-shaped bracket secured to the first end of said base and having the sides thereof extending normal to the longitudinal axis of said base and positioned to guide the edges of said blade;

an arm pivotally connected to said base and displaceable to urge said blade against said base; and means for yieldably urging said arm against said base.

10. A probe holder as in claim 9 for testing of a turbomachine blade having a significant amount of camber and secured to a conically extending rotor and wherein said probe further comprises:

a pin extending laterally and inwardly from one of the sides of said U-shaped bracket, said pin being positioned so that it acts as a pivot point for one of the edges of said blade whereby said arm yieldably urges the central portion of said blade towards surface contact with said probe;

stop means extending from the first end of said base and having a length sufficient to maintain the longitudinal axis of the probe base generally normal to the axis of rotation of said rotor.

11. A probe holder as in claim 8 further comprising:

guide means receiving said probe support frame for limiting the displacement of said probe support frame in a plane normal to the face of said probe;

means for adjustably mounting said guide means to said base for varying the position of the plane in which said probe is displaced relative to the longitudinal axis of said base.

References Cited

FOREIGN PATENTS 172,102    7/1965    U.S.S.R.

JAMES J. GILL, Primary Examiner

A. E. KORKOSZ, Assistant Examiner

U.S. Cl. X.R.

73—71.5